United States Patent
Chen et al.

(10) Patent No.: US 7,671,631 B2
(45) Date of Patent: Mar. 2, 2010

(54) LOW VOLTAGE DIFFERENTIAL SIGNAL RECEIVING DEVICE

(75) Inventors: Yung-Jann Chen, Taipei (TW); Chiu-Feng Lien, Taipei (TW)

(73) Assignee: Explore Semiconductor, Inc., Sijhih (TW)

( * ) Notice: Subject to any disclaimer, the term of this patent is extended or adjusted under 35 U.S.C. 154(b) by 747 days.

(21) Appl. No.: 11/523,619

(22) Filed: Sep. 20, 2006

(65) Prior Publication Data

US 2008/0068355 A1 Mar. 20, 2008

(51) Int. Cl.
*H03K 19/0175* (2006.01)
*H04B 14/06* (2006.01)

(52) U.S. Cl. .......................................... 326/82; 375/244

(58) Field of Classification Search .................. 375/714
See application file for complete search history.

(56) References Cited

U.S. PATENT DOCUMENTS

| | | | |
|---|---|---|---|
| 7,020,208 B1* | 3/2006 | Yen ............................ | 375/244 |
| 2003/0212930 A1* | 11/2003 | Aung et al. .................. | 714/700 |
| 2004/0086069 A1* | 5/2004 | Engel et al. .................. | 375/371 |
| 2006/0165195 A1* | 7/2006 | Dally et al. .................. | 375/316 |
| 2007/0132485 A1* | 6/2007 | Alon et al. ...................... | 327/18 |
| 2007/0298752 A1* | 12/2007 | Nakada .................... | 455/343.1 |
| 2008/0137790 A1* | 6/2008 | Cranford et al. ............ | 375/357 |
| 2008/0144760 A1* | 6/2008 | Song et al. ................... | 375/371 |
| 2008/0273647 A1* | 11/2008 | Segaram ...................... | 375/371 |
| 2009/0103674 A1* | 4/2009 | Wang .......................... | 375/376 |
| 2009/0140967 A1* | 6/2009 | Sarmento ...................... | 345/98 |

\* cited by examiner

*Primary Examiner*—Vibol Tan
*Assistant Examiner*—Dylan White
(74) *Attorney, Agent, or Firm*—Birch, Stewart, Kolasch & Birch, LLP

(57) ABSTRACT

A low voltage differential signal receiving device includes two differential receivers, two oversamplers, a phase locked loop, and a clock edge and data boundary detection & data extraction logic module. Clock and data signals are transmitted via channels having the same circuit layout, so that the clock signal is treated as another type of data signal. A frequency of sampling input clock and data is increased via asynchronous clock, clock transition is detected, and data bytes are extracted from clock and data samples. Therefore, the clock signal and the data signal have the same delay time to avoid any sampling error due to a difference in time sequence between the clock and the data. Meanwhile, due to the accurately increased sampling frequency, the sampled clock and the data signals are not adversely affected by different factors to enable upgraded data transmission efficiency and quality at the same time.

4 Claims, 3 Drawing Sheets

US 7,671,631 B2

LOW VOLTAGE DIFFERENTIAL SIGNAL RECEIVING DEVICE

FIELD OF THE INVENTION

The present invention relates to a low voltage differential signal receiving device, and more particularly to a low voltage differential signal receiving device capable of upgrading the transmission quality and efficiency of low voltage differential signals.

BACKGROUND OF THE INVENTION

Processors being developed in recent years have a largely increased operation speed, and the quantity of data being processed within unit time is constantly increased. Thus, either the transmission of data between a computer and peripheral equipment, or various applications of integrated circuit (IC) products must rely on an interface circuit capable of transmitting and receiving very large amount of data. While an optical fiber may be used to transmit data over a long distance from a few decades to a few hundreds of kilometers, it is impractical to use the optical fiber to transmit data within a few meters or between different on-chip buses on a circuit board. Therefore, cables or links on a circuit board are used to receive and transmit data. In conventional techniques, the bandwidth and transmission rate are increased by increasing the number of links. However, due to limited mounting area on the circuit board, and the demands for low power consumption, reduced production cost, and simplified production and assembling procedures, it is necessary to develop a more efficient interface design.

A low voltage differential signal (LVDS) has been widely employed on a video interface between a panel and an image control IC of a liquid crystal display (LCD). In the beginning, LVDS is developed to replace the high-power emitter-coupled logic (ECL) linear driving technique. By way of reducing power, the technique of LVDS enhances the limited characteristics of ECL and may be powered by a common power supply, highly integrated, and compatible with low-cost IC package.

LVDS is a physical layer data interface standard defined by ANSI/TIA/EIA-644 and IEEE 1596.3 standard specifications, and is also widely referred to as RS-644. This standard only defines the electric characteristics of driver output and receiver input, and does not include definition regarding the function, protocol, and cable thereof. The LVDS has been widely employed in communication and display interfaces to replace many traditional interfaces, such as RS-422, PECL (positive emitter coupling logic), and LV-PECL (low-voltage positive emitter-coupled logic). With the differential characteristic, the LVDS is superior to other interfaces in that (1) it may be used in an environment using low-voltage power supply, (2) it produces signals of low noise, (3) it has high anti-noise ability, (4) it has powerful signal transmitting ability, and (5) it may be easily integrated into a system chip.

Following the tendency of low weight and compactness, all kinds of electronic apparatus, from the circuit board to the bus for a display, must be produced slimmer and slimmer while providing higher transmission rate. An LVDS chipset is able to overcome this problem. For a circuit board with the LVDS chipset, some normally necessary resistors and capacitors may be canceled now to reduce the cost and required space of the circuit board.

While the conventional LVDS has the above-mentioned advantages, it also has some shortcomings in design that are difficult to break through up to date.

An LVDS connecting port consists of a clock differential pair and multiple data differential pairs. In each clock cycle, every data channel transmits 7 bits of data. For the receiver to correctly receive data, the edge of the clock must be aligned with the data bit stream in every data channel. FIG. 1 shows the sequences of LVDS clock and data.

In a common design for the conventional LVDS receiver, a phase locked loop (PLL) or a delay locked loop (DLL) is used to produce seven (7) phase clock signals, and each of the 7 phase clocks is used to retrieve corresponding data bits from the data stream. The edges of these 7 phase clock signals must be aligned with the corresponding data bits. FIG. 2 shows the configuration of a conventional LVDS receiver.

The problem in the existing LVDS receivers is that the clock and data signal channels have different delay times due to influences from many factors. Different factors, such as the number, the type, the manufacturing process, and the voltage variation of electronic elements on every channel, would result in differences in time sequence between each pair of corresponding clock and data. This tends to cause sampling errors to adversely affect the signal transmission quality. And, such adverse influence becomes significant with the increased data transmission rate.

To overcome the large quantity of sampling errors at the increased data transmission rate, it is necessary for the existing LVDS receiver to adjust the circuit layout against the different number, type, manufacturing process, and voltage variation of electronic elements between the clock and the data channels, so as to increase the data transmission rate and the signal transmission quality at the same time. However, it would take the manufacturer a large amount of time and efforts to do so.

That is, it is very difficult to increase the data transmission rate and the signal transmission quality at the same time under the existing LVDS receiver configuration.

It is therefore tried by the inventor to develop a low voltage differential signal receiving device to overcome the above-mentioned problem.

SUMMARY OF THE INVENTION

A primary object of the present invention is to provide a low voltage differential signal receiving device to easily achieve upgraded data transmission rate and quality at the same time.

Another object of the present invention is to provide a low voltage differential signal receiving device that can be applied to various kinds of display products.

A further object of the present invention is to provide a low voltage differential signal receiving device that has the advantages of having a wide range of applications, stable transmission, low manufacturing cost, and long service life.

To achieve the above and other objects, the low voltage differential signal receiving device according to the present invention includes two differential receivers, two oversamplers, a phase locked loop, and a clock edge and data boundary detection & data extraction logic module. In the present invention, a clock signal and a data signal are transmitted via channels having the same circuit layout, so that the clock signal is treated as another type of data signal. A frequency of sampling input clock and data is increased via asynchronous clock, and a specific clock edge and data boundary detection & data extraction logic module is used to detect clock transition and extract data bytes from clock and data samples. With the implementation framework of the present invention, the clock signal and the data signal have the same delay time to avoid any sampling error due to a difference in time sequence between the clock and the data. Meanwhile, due to the accurately increased sampling frequency, the sampled clock and the data signals are not adversely affected by different factors, including the number, type, and manufacturing process, and voltage variation of electronic elements. Therefore, the present invention may effectively upgrade the data transmission efficiency and quality at the same time.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
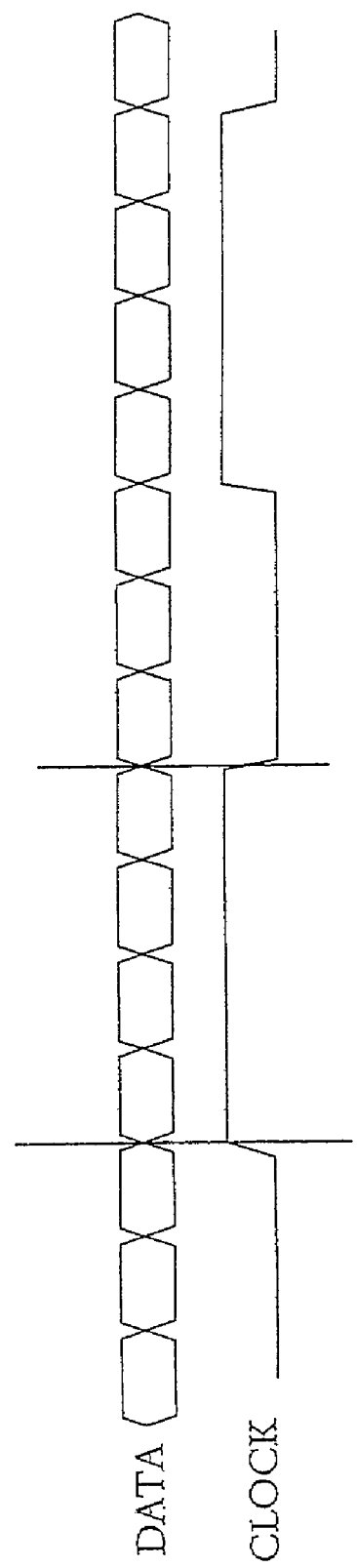
FIG. 1 is a diagram showing the clock and data sequences of a conventional low voltage differential signal.
Figure 2:
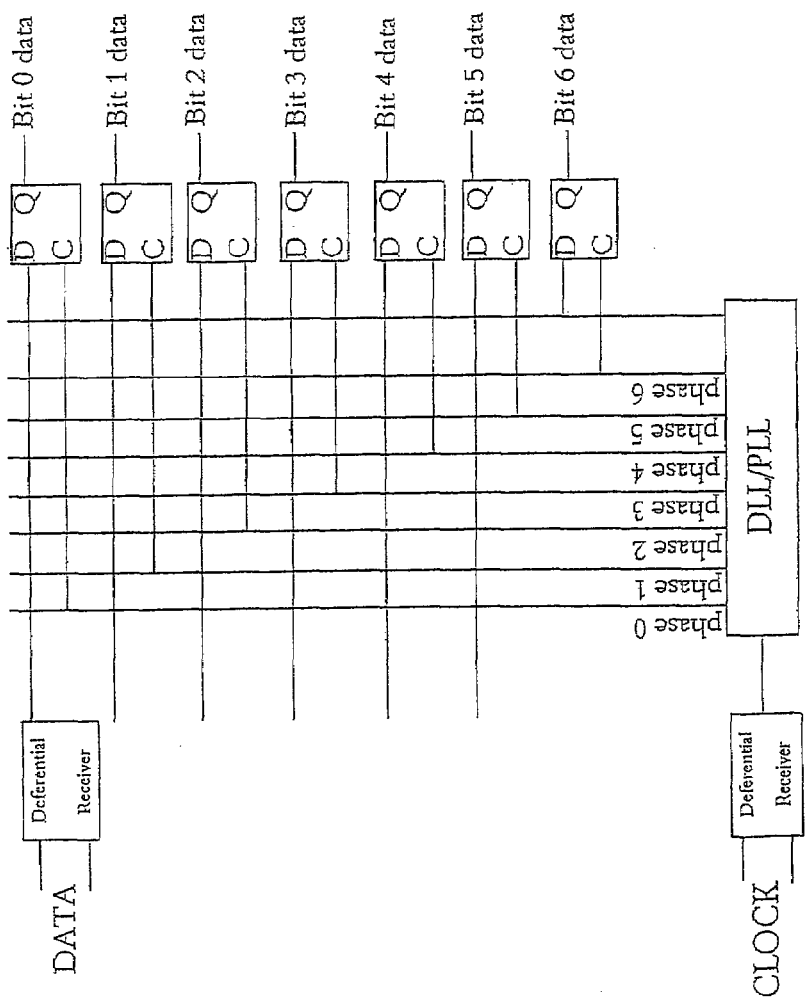
FIG. 2 is an implementation configuration of a conventional low voltage differential signal receiving device.
Figure 3:
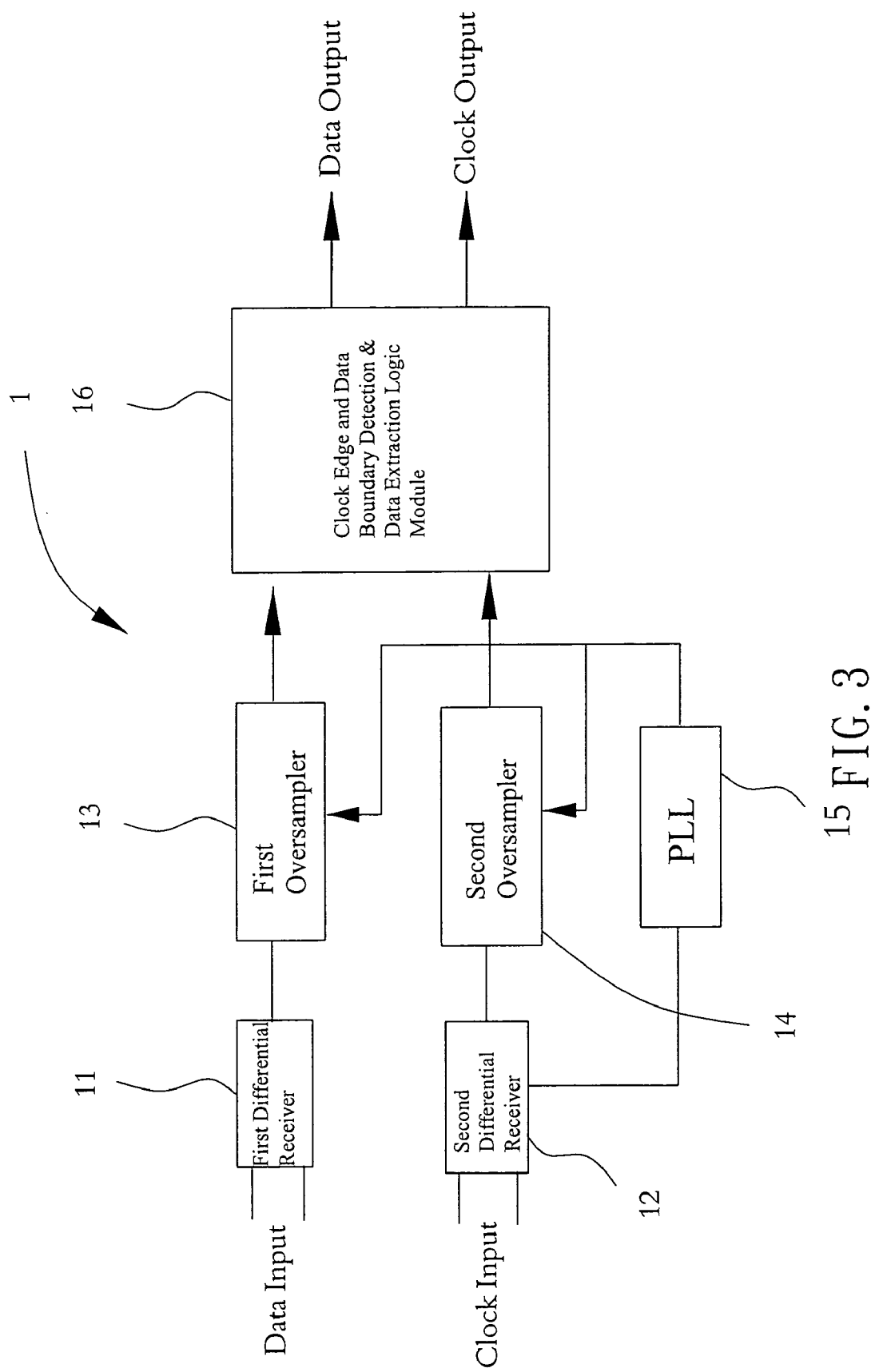
FIG. 3 is an implementation framework diagram of a low voltage differential signal receiving device according to the present invention.

Please refer to FIG. 3 that is an implementation framework diagram of a low voltage differential signal receiving device 1 according to the present invention. As shown, the low voltage differential signal receiving (LVDS) device 1 includes a first differential receiver 11, a second differential receiver 12, a phase locked loop (PLL) 15, and a clock edge and data boundary detection and data extraction logic module 16.

The first differential receiver 11 receives a data signal from a data signal input, and sequentially outputs the received data signal to a first oversampler 13 and the clock edge and data boundary detection and data extraction logic module 16. When there is more than one data signal input, the first differential receiver 11 and the first oversampler 13 may be in a number corresponding to that of the data signal input to receive multiple data signals at the same time.

The second differential receiver 12 receives a clock signal and sequentially outputs the received clock signal to a second oversampler 14 and the clock edge and data boundary detection and data extraction logic module 16.

The phase locked loop (PLL) 15 receives the clock signal output by the second differential receiver 12, and outputs a sampling clock to both of the first oversampler 13 and the second oversampler 14.

The clock edge and data boundary detection and data extraction logic module 16 receives signals output by the first oversampler 13 and the second oversampler 14, conducts sampling, and outputs a data signal and a clock signal.

In the present invention, the clock signal and the data signal are caused to be transmitted via channels having the same circuit layout, so that the clock signal is treated as another type of data signal; and the frequency of sampling input clock and data is increased via asynchronous clock; then, a specific clock edge and data boundary detection and data extraction logic module is used to detect clock transition and extract data bytes from the clock and data samples. With the implementation framework of the present invention, the clock signal and the data signal have the same delay time to avoid any sampling error due to a difference in time sequence between the clock and the data. Meanwhile, due to the accurately increased sampling frequency, the sampled clock and the data signals are not adversely affected by different factors, including the number, type, manufacturing process, and voltage variation of electronic elements. Therefore, the present invention may effectively increase the data transmission efficiency and quality at the same time.

The present invention has been described with a preferred embodiment thereof and it is understood that many changes and modifications in the described embodiment can be carried out without departing from the scope and the spirit of the invention that is intended to be limited only by the appended claims.

What is claimed is:

1. A low voltage differential signal receiving device, comprising a first differential receiver, a second differential receiver, a phase locked loop (PLL), and a clock edge and data boundary detection and data extraction logic module;

said first differential receiver receiving a data signal from a data signal input, and sequentially outputting said received data signal to a first oversampler;

said second differential receiver receiving a clock signal, and sequentially outputting said received clock signal to a second oversampler;

said phase locked loop receiving said clock signal output by said second differential receiver, and outputting a sampling clock to both of said first oversampler and said second oversampler; and said clock edge and data boundary detection and data extraction logic module receiving signals output by said first oversampler and said second oversampler, conducting sampling, and outputting a data signal and a clock signal; and wherein said clock signal is treated as another type of data signal; a frequency of sampling input clock and data is increased via asynchronous clock; and said specific clock edge and data boundary detection and data extraction logic module is used to detect clock transition and extract data bytes from clock and data samples.

2. The low voltage differential signal receiving device as claimed in claim 1, wherein said data signal input is more than one in number.

3. The low voltage differential signal receiving device as claimed in claim 2, wherein said first differential receiver and said data signal input are the same in number.

4. The low voltage differential signal receiving device as claimed in claim 2, wherein said first oversampler and said data signal input are the same in number.

* * * * *